Nov. 23, 1954

D. A. MARRA 2,694,851

METHOD OF FORMING TORCH TIPS

Filed April 28, 1948

Inventor
Daniel A. Marra
By Christy, Parmelee and Strickland
his Attorneys

United States Patent Office 2,694,851
Patented Nov. 23, 1954

2,694,851

METHOD OF FORMING TORCH TIPS

Daniel A. Marra, Cheswick, Pa.

Application April 28, 1948, Serial No. 23,669

1 Claim. (Cl. 29—157)

This invention relates to blow-pipe tips, particularly to tips for the well-known welding and cutting torches that have long been used in industry, and the invention consists in certain new and useful improvements both in the tip and in the method of manufacturing it.

The object of the invention is to provide a tip which is many times more durable in service than any of the tips known heretofore.

A blow-pipe tip comprises essentially a nozzle which is removably attached to the delivery end of a torch, and through the tip oxygen and combustible gas are jetted, to provide (in the case of a welding torch) a welding flame, or to provide (in the case of a cutting torch) a heating flame and a stream of oxygen for cutting the steel or other metal to be severed. It will be understood that in service a blow-pipe tip is subject to the destructive effects of heat and oxygen, the delivery end of the tip being exposed in the presence of oxygen to metal at welding or melting temperatures.

A major problem in the art has always been to provide a tip which will endure for a reasonably long period of service, and the art is replete with patented structures directed to a solution of this problem. While many improvements have been made in tip structures, this basic problem has remained unsolved. The tips most widely used hitherto have been constructed of copper or copper alloys, but these tips in relatively short periods of service become permanently mutilated under the effects of heat, oxygen and rough usage, wherefore they must be frequently replaced at considerable cost to the users. Refractory and thermal insulating inserts have been proposed for the delivery ends of tips, with the thought of providing at the most vulnerable part of the tip structure increased resistance to the mutilating effects of heat and oxygen, but none of the proposed structures has proved adequate and commercially practical.

My invention stems from the discovery that a class of metals known as sintered carbides has the unexpected ability, when exposed to temperatures at which steel is welded or cut, to withstand the effect of oxygen. In the successful application of this discovery, the tips known heretofore are substantially altered or modified in construction, as will appear in the ensuing specification.

It may further be noted that the invention is predicated upon the provision of a tip structure wherein an expensive sintered carbide shoe is so incorporated as to give a tip at only four or five times the cost of tips now commonly supplied to the art, while affording a service life twenty-five times longer, and more. Additionally in a tip constructed in accordance with my invention, the sintered carbide shoe, while to all intents and purposes constituting a permanent element of the integrated tip structure, may be recovered from a worn tip and re-processed for use again in a new tip, thereby increasing still further the great economies attending the practice of the invention.

The invention will be described as it has been developed in a welding torch tip, but the application of the invention to cutting torch tips, scarfing tips and other forms of blow-pipe tips will be apparent to those skilled in the art. In the accompanying drawings.

Figure 1:
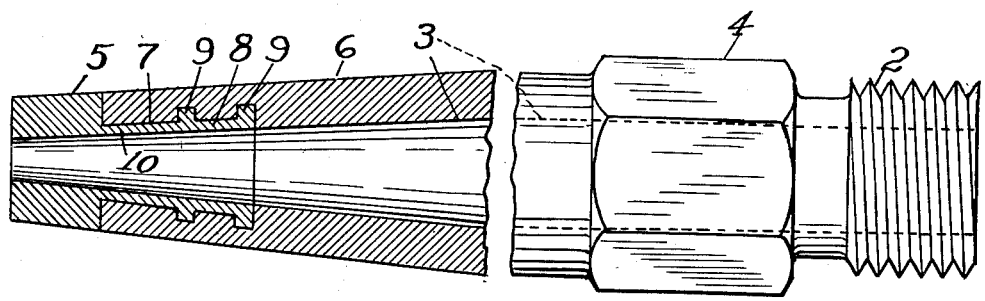
Fig. 1 is a fragmentary view of a welding tip embodying the invention, the tip appearing partly in side elevation and partly in axial section.

Referring to Fig. 1 of the drawings the welding tip, illustrated in exemplary way, comprises a tubular structure threaded at its head end, 2, for attachment in the head of a welding torch (not shown) that delivers a mixture of combustible gas (such as acetylene) and oxygen into the bore 3 of the tip. The tip as usual may include a flat sided portion 4 to receive a wrench for screwing the tip into hermetic engagement with the torch head, although it is to be remarked that the threaded end and body of the tip may vary widely to adapt it for use in one or another of the many torch structures now in use. Such details do not go to the essence of the invention.

In this case the bore 3 of the tip is tapered toward its delivery end (the left-hand end in Fig. 1), whence the combustible mixture of gas and oxygen delivered by the torch is emitted, to sustain a welding flame. The flow of the combustible mixture is controlled by conventional valves in the torch, whereby the velocity and intensity of the flame are maintained as need be for the welding operation. A wear-resisting shoe 5 is provided at the delivery end of the tip structure.

The main body 6 of the tip comprises a tubular section of copper, brass, aluminum or other suitable material. It is desirable that such material shall be ductile or formable, as it is, under pressure or swedging stress; that it shall be readily machinable; and that it shall have a relatively high coefficient of thermal conductivity. The shoe 5 is a tubular device, formed of a sintered carbide which is, as known, exceedingly hard and resistant to wear and deformation. Such a shoe 5 is highly refractory, and contrary to expectations it retains its hardness and integrity when exposed to heat at the welding or melting temperatures of steel in the presence of the oxygen delivered with the fuel gas through the tip. In the structure of this invention the carbide shoe is resistant to thermal fracture, and possesses characteristics of thermal expansion which are distinctly compatible with the relatively formable material of which the remainder of the tip is formed. The main body portion 6 of the tip is relatively destructible under the rough usage to which it is exposed in service, while the shoe 5 is relatively durable, and even though the tip structure in its entirety is serviceable for over twenty-five times the life of the tips hitherto in use, the relatively destructible body portion 6 eventually becomes mutilated to the extent that the tip must be renewed. In accordance with the invention, however, the life of the shoe 5 is not sacrificed to the dissipation of the remainder of the tip. The shoe 5, as will presently appear, is assembled with the body portion 6 in a hermetic joint which to all intents and purposes is an indestructible or permanent union, but which indeed is only so from a utilitarian standpoint. When the tip at length fails because of the mutilation of the portion 6, the joint 7 may be intentionally broken and the shoe recovered for use again with a new body portion 6 to form a new tip.

The sintered carbide of which the shoe 5 is formed may comprise the hard carbide of tungsten, or tantalum, or titanium, or silicon, or zirconium, or beryllium, or thorium, or vanadium, or chromium, or molybdenum, or uranium, or boron, or the alloys or mixtures of such elements with each other and/or iron. The particular method of compounding and forming articles of such sintered or cemented carbides is well known in the metallurgical art and need not be dwelt upon in this specification directed to the torch tip art.

The sintered metallic carbide shoe 5 comprises preferably, if not essentially, a disk or head portion to which the reference numeral 5 is immediately applied, and a tubular portion 8 of smaller diameter, or girth, equipped with at least one annular collar, and preferably two or more annular collars 9 designed in the assembly of the shoe with the body portion 6 to form an interlocked, hermetic, rim-and-groove union. The disk or head portion 5 of the shoe overlies and caps and protects the end of the body portion 6 at the discharge end of the tip, while the shoe portion 7 is received telescopically and embedded in the enveloping substance of the body portion 6. The bore or passage 10 in the shoe is aligned with and forms a continuation of the bore 3 of the body 6. In this case the bore of the tip desirably is tapered from a point partway of its extent toward the delivery end of the tip structure. The bore 10 in the shoe is preformed to the final size and shape desired in the finished tip, and the bore 3 in the body 6 is fashioned to form a smooth continuation of the bore 10, as may be understood upon considering Figure 1 of the drawings.

Figure 2:
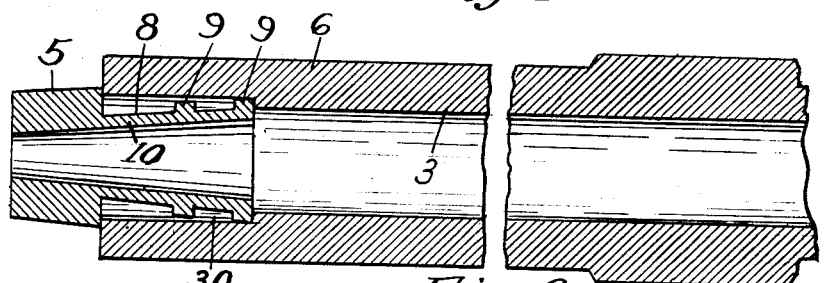
Fig. 2 is a fragmentary view in axial section of the end portion of the main tubular body of which the tip is formed, with a sintered carbide shoe inserted in the end of the tubular body preparatory to the assembling operation.
Figure 3:
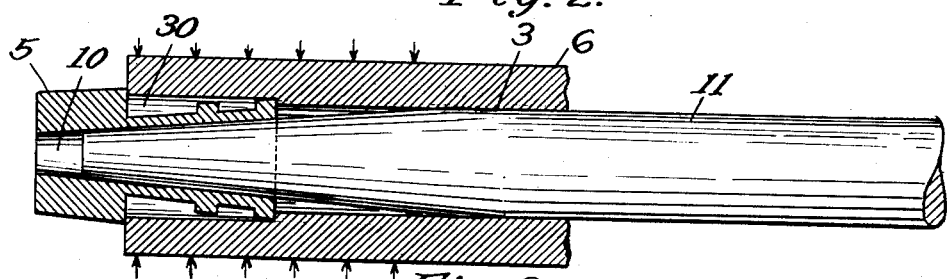
Fig. 3 is a view comparable with Fig. 2, showing additionally a mandrel introduced and in place for the assembling operation.

In the manufacture of the tip structure the shoe 5 and the body 6 are substantially completely produced in preliminary procedures with which this invention is not immediately concerned. The body portion 6 of this tip, comprising a tubular member of ductile or formable material, as noted in the foregoing context, may be formed with its bore 3 of uniform diameter, save at the end where the bore is provided in larger diameter, as indicated at 30, to receive telescopically the shoe portion 8, with the disk or head portion (5) of the shoe positioned over the terminal edge of the bore portion 30, as shown in Figure 2. Next, a mandrel 11 is brought into position in the assembly, as shown in Figure 3, the tip of the mandrel be contoured to snugly engage the bore 10 in the shoe. The body of the mandrel extending from the shoe and lying within the body portion 6 may be contoured to the ultimate form of bore desired in the finished tip. With the parts thus assembled the ductile or formable body portion 6 is compressed or swedged in a press or other suitable machine, and under pressure applied as indicated by the arrows in Figure 3 the material of the body portion 6 is shaped upon the mandrel and the shoe portion 8, and brought into the integrated assembly shown in Figure 1. The substance of the body portion 6 is minutely shaped upon the shoe portion 8 and mandrel, forming a tight, interlocked union of the two tip parts. To the extent that the telescoped portion 8 of the shoe and the body of the mandrel 11 cooperate during and/or in the shaping of the substance of the tubular body 6, such telescoped portion 8 and the mandrel, manifestly, may be properly termed a forming die element. The bore 3 in the body portion 6 is shaped as a smooth continuation of the bore 10 in the shoe, and the shoe and the body of portion 6 become in effect an integral structure. The external surface of the compressed body of the portion 6 may be machined and buffed, whereby the assembled parts partake of integrity in appearance as well as in structure.

Such is the structure and method of producing a tip that affords advantages of the nature indicated.

Figure 4:
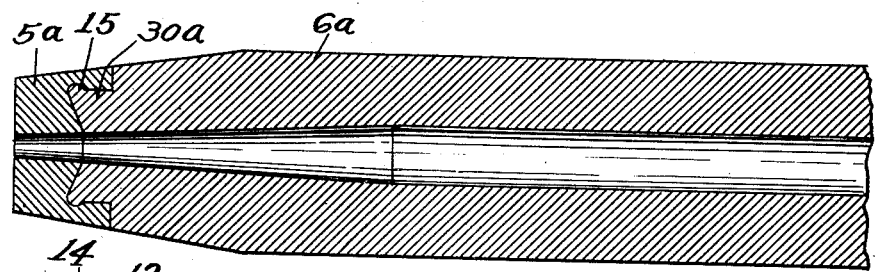
Fig. 4 is a fragmentary sectional view of a modified tip of the invention.
Figure 5:
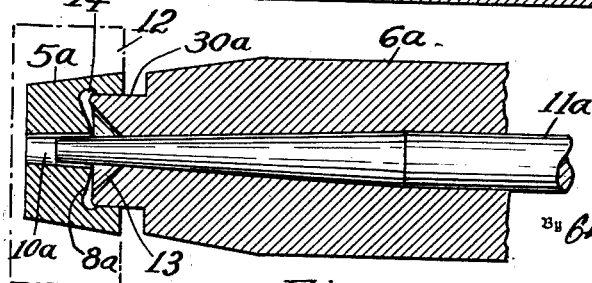
Fig. 5 illustrates the method of producing the tip of Fig. 5.

In Figure 4 is illustrated one of the many modifications that may be practiced within the essence of the invention defined in the appended claim. In this particular modification, the sintered carbide shoe 5a is cup shaped to receive telescopically a terminal portion 30a on the ductile or formable body portion 6a of the tip. In effecting the assembly of the parts the shoe 5a may be supported in a recessed anvil, indicated in broken lines 12, and a mandrel 11a is positioned as shown in Figure 5. The body 6a and the mandrel are forced in unison to the left, driving the terminal portion 30a into the recess in the shoe. It will be noted that the end of the portion 30a is formed with a conical recess 13, and the inner face of the recess 8a in the shoe is drafted, so that the forced advance of the portion 6a upon the shoe 5a causes the metal in terminal part 30a to "flow" laterally into an internal annular enlargement 14 in the recess in the shoe. Upon the complete enforcement of the terminal part 30a into the recess 8a, the mandrel enters snug engagement with the bore 10a of the shoe, thereby insuring accurate alignment of the parts. Thereafter, the mandrel is removed from the united parts 5a and 6a. The integrated assembly shown in Figure 4 is thus provided, with the body of terminal portion 30a interlocked in a rib-and-groove engagement 15, and the recess in the shoe securely engaged in a hermetic union upon the body portion 30a.

While the assembly of the shoe with the main body portion of the tip provides, in the case of each structure described, a permanent or enduring integration of the parts, when the destructible portion (6 or 6a) of the tip becomes fatally mutilated, the mutilated body portion may be readily cut or fused away, to effect the release of the shoe, whereby it may be reclaimed for use again, in a new tip assembly.

An important feature remains to be mentioned: In prior tip structures the smoke generated by the combustion of acetylene accumulates on the end of the tip and means to act as a flux which causes bits of molten steel, splattering upward during a welding operation, to weld to the end of the tip, with obvious objections. The sintered carbide shoe on the end of the tip of this invention is buffed to a mirror finish, and neither smoke nor particles of molten metal will adhere to it.

The application for this patent comprised a continuation-in-part of an application, Serial No. 750,183, filed by me on May 24, 1947, and now patent No. 2,655,988.

I claim:

The method of forming and assembling a blow-torch tip comprising an elongate tubular body formed of a metal which is relatively soft and possesses relatively high thermal conductivity, with low strength and durability when exposed to steel at fusing temperature in the presence of oxygen, and a perforate terminal protecting shoe of a relatively hard, highly-refractory sintered carbide of lower thermal conductivity, with high strength and durability when exposed to said temperature in the presence of oxygen, which method comprises assembling in position upon a mandrel said tubular body and said shoe partially telescoped one within the other to constitute the assembled mandrel and the portion of said shoe telescoped with respect to said tubular body a forming die element, and forcefully displacing the substance of said relatively soft tubular body with respect to such die element locally into a mechanically integrated hermetic union with said shoe while shaping the substance of said tubular body to bring the bore therein to an exact conformity with the perforation in said shoe, whereby an accurately-formed continuous passageway is provided throughout the integrated tip structure.

References Cited in the file of this patent

UNITED STATES PATENTS

| Number | Name | Date |
| --- | --- | --- |
| 1,114,706 | Brousseau | Oct. 20, 1914 |
| 1,568,331 | Harris | Jan. 5, 1926 |
| 1,693,838 | Faudi | Dec. 4, 1928 |
| 1,783,791 | Hughes | Dec. 2, 1930 |
| 1,849,603 | Weatherhead | Mar. 15, 1932 |
| 1,939,373 | Tilley | Dec. 12, 1933 |
| 1,958,044 | Hendricks | May 8, 1934 |
| 2,044,697 | Huss | June 16, 1936 |
| 2,084,349 | Laise | June 2, 1937 |
| 2,088,838 | Whittier et al. | Aug. 3, 1937 |
| 2,123,576 | McKenna | July 12, 1938 |
| 2,148,040 | Schwarzkopf | Feb. 21, 1939 |
| 2,267,623 | Self et al. | Dec. 23, 1941 |
| 2,294,392 | Egger et al. | Sept. 1, 1942 |
| 2,343,958 | Crowe | Mar. 14, 1944 |
| 2,365,411 | Jacobsson | Dec. 19, 1944 |
| 2,380,570 | Babcock | July 31, 1945 |
| 2,383,949 | Aronson | Sept. 4, 1945 |
| 2,431,660 | Gaudenzi | Nov. 25, 1947 |
| 2,433,539 | Westerman | Dec. 30, 1947 |
| 2,468,824 | Hughey | May 3, 1949 |